(12) United States Patent
Devarajan et al.

(10) Patent No.: US 8,738,605 B2
(45) Date of Patent: *May 27, 2014

(54) SYSTEMS FOR DISCOVERING SENSITIVE INFORMATION ON COMPUTER NETWORKS

(75) Inventors: Ganesh Devarajan, Phoenix, AZ (US); Todd Redfoot, Phoenix, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 166 days.

This patent is subject to a terminal disclaimer.

(21) Appl. No.: 13/436,751

(22) Filed: Mar. 30, 2012

(65) Prior Publication Data

US 2013/0262428 A1 Oct. 3, 2013

(51) Int. Cl.
*G06F 7/02* (2006.01)
*G06F 17/30* (2006.01)

(52) U.S. Cl.
CPC .... *G06F 17/30864* (2013.01); *G06F 17/30985* (2013.01); *G06F 17/30283* (2013.01)
USPC ............ 707/709; 707/694; 707/827; 707/722

(58) Field of Classification Search
CPC .................... G06F 17/30864; G06F 17/30985; G06F 17/30283
See application file for complete search history.

(56) References Cited

U.S. PATENT DOCUMENTS

| | | | |
|---|---|---|---|
| 5,426,594 A | 6/1995 | Wright et al. | |
| 5,774,660 A | 6/1998 | Brendel et al. | |
| 5,872,848 A | 2/1999 | Romney et al. | |
| 6,003,030 A | 12/1999 | Kenner et al. | |
| 6,151,631 A | 11/2000 | Ansell et al. | |
| 6,263,447 B1 | 7/2001 | French et al. | |
| 6,393,482 B1 | 5/2002 | Rai et al. | |
| 6,400,722 B1 | 6/2002 | Chuah et al. | |
| 6,598,077 B2 | 7/2003 | Primak et al. | |
| 6,625,643 B1 | 9/2003 | Colby et al. | |
| 6,629,136 B1 | 9/2003 | Naidoo | |
| 6,675,208 B1 | 1/2004 | Rai et al. | |
| 6,757,740 B1 | 6/2004 | Parekh et al. | |
| 6,829,230 B1 | 12/2004 | Tiuri | |
| 6,996,609 B2 | 2/2006 | Hickman et al. | |
| 7,111,072 B1 | 9/2006 | Matthews et al. | |
| 7,139,840 B1 | 11/2006 | O'Toole | |
| 7,149,892 B2 | 12/2006 | Freed et al. | |
| 7,225,248 B1 | 5/2007 | Osburn | |
| 7,233,978 B2 | 6/2007 | Overton et al. | |
| 7,359,935 B1 | 4/2008 | Karipides et al. | |
| 7,373,500 B2 | 5/2008 | Ramelson et al. | |
| 7,382,321 B1 | 6/2008 | Qin | |

(Continued)

OTHER PUBLICATIONS

Zenel, A General Purpose Proxy Filtering Mechanism Applied to the Mobile Environment, Wireless Network, vol. 5, Issue 5, Oct. 1999, pp. 391-409.

(Continued)

*Primary Examiner* — Bruce Moser
(74) *Attorney, Agent, or Firm* — Karl A. Fazio

(57) ABSTRACT

One embodiment of a system of the present invention for discovering sensitive information on computer network includes means for discovering databases on a computer network, means for defining a pattern for a data discovery, means for discovering qualifying records by matching the pattern with field names and/or record values in the databases, means for sending electronic notification to a database administrator managing the qualifying database, means for receiving a selection choice from the database administrator managing the qualifying database identifying the status for the qualifying records.

11 Claims, 24 Drawing Sheets

(56) References Cited

U.S. PATENT DOCUMENTS

| | | |
|---|---|---|
| 7,506,010 B2 | 3/2009 | Kulkarni et al. |
| 7,590,073 B2 | 9/2009 | Beckmann et al. |
| 7,644,117 B2 | 1/2010 | Zimmerman et al. |
| 7,649,854 B2 | 1/2010 | Piper |
| 7,805,379 B1 | 9/2010 | Adkins et al. |
| 2001/0001854 A1 | 5/2001 | Schena |
| 2001/0046227 A1 | 11/2001 | Matsuhira et al. |
| 2002/0035611 A1 | 3/2002 | Dooley |
| 2002/0042719 A1 | 4/2002 | Chauchard et al. |
| 2002/0073235 A1 | 6/2002 | Chen et al. |
| 2002/0087643 A1 | 7/2002 | Parsons et al. |
| 2002/0147790 A1 | 10/2002 | Snow |
| 2002/0152224 A1 | 10/2002 | Roth et al. |
| 2003/0005287 A1 | 1/2003 | Wray et al. |
| 2003/0069991 A1 | 4/2003 | Brescia |
| 2003/0078894 A1 | 4/2003 | Kon |
| 2003/0078962 A1 | 4/2003 | Fabbricatore et al. |
| 2003/0101278 A1 | 5/2003 | Garcia-Luna-Aceves et al. |
| 2003/0229900 A1 | 12/2003 | Reisman |
| 2004/0039906 A1 | 2/2004 | Oka et al. |
| 2004/0083307 A1 | 4/2004 | Uysal |
| 2004/0167858 A1 | 8/2004 | Erickson |
| 2004/0186778 A1 | 9/2004 | Margiloff et al. |
| 2004/0210663 A1 | 10/2004 | Phillips et al. |
| 2005/0105513 A1 | 5/2005 | Sullivan et al. |
| 2005/0114541 A1 | 5/2005 | Ghetie et al. |
| 2005/0134896 A1 | 6/2005 | Koga |
| 2005/0228881 A1 | 10/2005 | Reasor et al. |
| 2005/0239447 A1 | 10/2005 | Holzman et al. |
| 2006/0047725 A1 | 3/2006 | Bramson |
| 2006/0126201 A1 | 6/2006 | Jain |
| 2006/0193333 A1 | 8/2006 | Baughan et al. |
| 2006/0198322 A1 | 9/2006 | Hares |
| 2006/0206547 A1 | 9/2006 | Kulkarni et al. |
| 2007/0038755 A1 | 2/2007 | Sullivan et al. |
| 2007/0094411 A1 | 4/2007 | Mullane et al. |
| 2007/0180436 A1 | 8/2007 | Travostino et al. |
| 2007/0198724 A1 | 8/2007 | Hawkinson et al. |
| 2007/0283005 A1 | 12/2007 | Beliles et al. |
| 2007/0291739 A1 | 12/2007 | Sullivan et al. |
| 2008/0005312 A1 | 1/2008 | Boss et al. |
| 2008/0019359 A1 | 1/2008 | Droux et al. |
| 2008/0052384 A1 | 2/2008 | Marl et al. |
| 2008/0059607 A1 | 3/2008 | Schneider |
| 2008/0071883 A1 | 3/2008 | Alterman |
| 2008/0120617 A1 | 5/2008 | Keller et al. |
| 2008/0126232 A1 | 5/2008 | Lee |
| 2008/0201413 A1 | 8/2008 | Sullivan et al. |
| 2008/0229430 A1 | 9/2008 | Kargman |
| 2008/0256553 A1 | 10/2008 | Cullen |
| 2008/0270418 A1 | 10/2008 | Chen et al. |
| 2008/0282338 A1 | 11/2008 | Beer |
| 2008/0287094 A1 | 11/2008 | Keeler et al. |
| 2009/0007229 A1 | 1/2009 | Stokes |
| 2009/0016522 A1 | 1/2009 | Torres et al. |
| 2009/0042537 A1 | 2/2009 | Gelbman et al. |
| 2009/0048712 A1 | 2/2009 | Rosenblum |
| 2009/0055506 A1 | 2/2009 | Hudson et al. |
| 2009/0132487 A1 | 5/2009 | Lev |
| 2009/0150527 A1 | 6/2009 | Tripathi et al. |
| 2009/0157882 A1 | 6/2009 | Kashyap |
| 2009/0248595 A1 | 10/2009 | Lu et al. |
| 2009/0272799 A1 | 11/2009 | Skor et al. |
| 2009/0300407 A1 | 12/2009 | Kamath et al. |
| 2010/0027420 A1 | 2/2010 | Smith |
| 2010/0042487 A1 | 2/2010 | Barazani |
| 2010/0306122 A1 | 12/2010 | Shaffer et al. |
| 2011/0055249 A1 | 3/2011 | Consuegra et al. |

OTHER PUBLICATIONS

Zenel, A General Purpose Proxy Filtering Mechanism Applied to the Mobile Environment, 1997.

Zenel, A Proxy Based Filtering Mechanism for the Mobile Environment, Doctoral Thesis, Columbia University, 1998.

Feb. 7, 2014 response to Nov. 6, 2013 office action in related U.S. Appl. No. 13/436,747.

Nov. 6, 2013 office action in related U.S. Appl. No. 13/436,747.

```
SELECT
      tb.TABLE_CATALOG,
      tb.TABLE_NAME,
      tc.COLUMN_NAME,
      tc.DATA_TYPE,
      CASE  WHEN column_name like '%pass%' then 'Password'
            WHEN column_name like '%username%' then 'Username'
            WHEN column_name like '%uname%' then 'Username'
            WHEN column_name like '%login%' then 'Username'
      ELSE 'other'
      END as Keyword,
      COALESCE(i.rows, 0) as NumOfRecords
FROM INFORMATION_SCHEMA.TABLES tb
INNER JOIN INFORMATION_SCHEMA.COLUMNS tc ON (tb.TABLE_CATALOG =
      tc.TABLE_CATALOG) AND
(tb.TABLE_NAME = tc.TABLE_NAME ) AND
(tb.TABLE_SCHEMA = tc.TABLE_SCHEMA )
INNER JOIN sysobjects o ON tb.TABLE_NAME = o.[name] AND o.xtype='U'
LEFT JOIN sysindexes i ON o.id = i.id AND i.indid = 1
WHERE (column_name like '%pass%' OR column_name like '%username%' OR
      column_name like '%uname%' OR column_name like '%login%')
AND tc.COLUMN_NAME NOT IN ('BypassHelpTip', 'GroupAssigned',
      'LastPasswordChangedDate', 'AppAssembly', 'billingDatePassThrough',
      'passive', 'isStrongPassword', 'AntiPass', 'ByPass', 'SubTestPass',
      'TestsPassed', 'RunPassed', 'Outcome Passing',
      'FailedPasswordAnswerAttemptCount')
AND (tc.COLUMN_NAME NOT LIKE '%salt%' OR tc.COLUMN_NAME NOT LIKE
      '%DotNet Passport Authentication Enabled%' )
AND tb.table_name not in ('syspublications')
AND tb.table_catalog NOT IN ('master', 'tempdb','msdb')
ORDER BY tb.table_name
```

FIG. 1

```
__author__="gdevarajan@godaddy"

import xml.dom.minidom
import commands
import os
import time
from xml.dom.minidom import Node print "Start Time (24hr) :", time.strftime("%H:%M:%S", time.localtime())
def nmap_command(i):

filename = 'py_nmap_171'+str(i)+'.xml'
    print "NMAPing 171."+ str(i) +".0.0/16 " + filename+ " Started   :",
        time.strftime("%H:%M:%S", time.localtime())
    cmd = 'C:\\Acropolis\\nmap.exe -p 1433,3306 171.'+ str(i) +'.0.0/16 -oX ' + 'C:\\
        Acropolis\\output\\' + filename
    print cmd
    stat,out = commands.getstatusoutput(cmd)
    out = os.popen(cmd).read()
    #print stat
    print "NMAPing 171."+ str(i) +".0.0/16 " + filename+ " Completed :",
        time.strftime("%H:%M:%S", time.localtime())
    xml_parser(filename,i)

def xml_parser(filename,i):
    print "Parsing " + filename+ " Started   :", time.strftime("%H:%M:%S",
        time.localtime())
    path = 'C:\\Acropolis\\output\\'
    name = ''
    doc = xml.dom.minidom.parse(path + filename)
    nmap_out_csv = open(path + "nmap_out_"+str(i)+".csv", 'w')
    for node in doc.getElementsByTagName("host"):
        for nd in node.getElementsByTagName("address"):
            addr = nd.getAttribute("addr")
        for hns in node.getElementsByTagName("hostnames"):
            for hn in node.getElementsByTagName("hostname"):
                name = hn.getAttribute("name")
                #print name
        for nd in node.getElementsByTagName("ports"):
            for pt in nd.getElementsByTagName("port"):
                port = pt.getAttribute("portid")
                for st in pt.getElementsByTagName("state"):
```

FIG. 2a

```
            state = st.getAttribute("state")
            if state =="open":
                #print addr
                #print port +"------------"+ state
                nmap_out_csv.write(addr+','+port +','+ state + ',' + name + '\n')
    nmap_out_csv.close()
    print "Parsing " + filename+ " Completed :", time.strftime("%H:%M:%S",
        time.localtime())

if __name__ == "__main__":
    for i in range(16,32):
        nmap_command(i)

# Re run 18, 22
    #xml_parser("nmap17116.xml")
```

FIG. 2b

```
# To change this template, choose Tools | Templates
# and open the template in the editor.

__author__="gdevarajan@godaddy"

'''
The proc to call for the ranges to scan is:
dbo.serverScanIPRangeGetByScanHost_sp '{Enter Server}'

The proc to call when starting to scan a range (to update the start time) is:
dbo.serverScanIPRangeUpdateScanStart_sp '{Enter IP}'

The proc to call when compliting scanning a range (to update the end time) is:
dbo.serverScanIPRangeUpdateScanEnd_sp '{Enter IP}' master.dbo.gdfn_ipBigint2Dot(ipint)

'''
import xml.dom.minidom
import commands
import os
import time
import re
import pyodbc
from xml.dom.minidom import Node print "Start Time (24hr) :", time.strftime("%H:%M:%S", time.localtime())
def SQLPing_command(startIP,endIP):
    conn_string = "DRIVER={SQL Server Native Client
        10.0};Trusted_Connection=yes;timeout=2;SERVER={Enter
        Server};Database={Enter Database}"
    mssql_conn = pyodbc.connect(conn_string)
    mssql_cursor = mssql_conn.cursor()

mssql_cursor.execute("""EXEC dbo.serverScanIPRangeUpdateScanStart_sp """ +
        str(startIP) + """)
    mssql_conn.commit()

print "Scanning - start IP: " + startIP + " AT:", time.strftime("%H:%M:%S",
        time.localtime())
```

FIG. 3a

```
#print "NMAPing 171."+ str(i) +".0.0/16 " + filename+ " Started   :", 
    time.strftime("%H:%M:%S", time.localtime())
cmd = 'SQLPing3cl.exe -scantype range -StartIP ' + startIP + ' -EndIP ' + endIP + ' -
    Output sqllist_'+ startIP + '_' + endIP + '.csv'
print cmd
stat,out = commands.getstatusoutput(cmd)
out = os.popen(cmd).read()
#print stat
#print out
print "Scanning - End IP: " + endIP + " AT:", time.strftime("%H:%M:%S", 
    time.localtime())
csv_parser('sqllist_'+ startIP + '_' + endIP + '.csv')

mssql_cursor.execute("""EXEC dbo.serverScanIPRangeUpdateScanEnd_sp """ + 
    str(startIP) + "")
mssql_conn.commit()
mssql_cursor.close()
mssql_conn.close()

def csv_parser(filename):
    conn_string = "DRIVER={SQL Server Native Client 
        10.0};Trusted_Connection=yes;timeout=2;SERVER={Enter 
        Server};Database={Enter Database}"
    mssql_conn = pyodbc.connect(conn_string)
    mssql_cursor = mssql_conn.cursor()

print "Parsing " + filename+ " Started   :", time.strftime("%H:%M:%S", 
        time.localtime())
    fileread = open(filename)
    ip_regex = re.compile('^([0-9\x2e\x2c\x2f]+)')
    values = '<Feeds>\n'
    for ln in fileread:
        if ln.find('&')>=0:
            ln = ln.replace('&',"&")
        if ln.find('<')>=0:
            ln = ln.replace('<',"<")
        if ln.find('>')>=0:
            ln = ln.replace('>',">")
        if ln.find('"')>=0:
            ln = ln.replace('"',""")
        if ln.find("'")>=0:
            ln = ln.replace("'","'")
```

FIG. 3b

```
      line = ln.split(',')
      ip = ip_regex.findall(str(line[0]))
      if ip != []:
         values = values + '<Entry ServerIP="'+ str(line[0]) + '" TCPPort="'+ str(line[1]) +
         '" ServerName="' + str(line[2]) + '" instanceName="'+ str(line[3]) +'"
         BaseVersion="' + str(line[4]) + '" SSNetlibVersion="'+ str(line[5]) +'"
         TrueVersion="'+ str(line[6]) +'" ServiceAccount="'+ str(line[7]) +'" IsClustered="'+
         str(line[8]) +'" Details="'+ str(line[9]) +'" DetectionMethod="'+ str(line[10]).strip()+
         '" />\n'
   values = values + "</Feeds>\n"

print values
   #gd_feedURLInsertXML_sp
   fileread.close()
   #print IPvalues
   print "Completed Building XML.."

try:
      mssql_cursor.execute("""EXEC instanceListAddUpdateXML_sp @xmldoc='""" +
         values + """'""")
      mssql_conn.commit()
   except Exception as e:
      print e
   print "Parsing " + filename+ " Completed :", time.strftime("%H:%M:%S",
      time.localtime())

if __name__ == "__main__":

SQLPing_command('10.1.128.0','10.1.128.255')
   #SQLPing_command('171.19.81.0','171.19.81.255')
   print "Enable one of the above: "
```

FIG. 3c

```
# To change this template, choose Tools | Templates
# and open the template in the editor.

__author__="gdevarajan"

import pyodbc
import SQLPing_Scanner
import threading serverScanIPRangeGetAll_sp to see everything in the table
No input parms
# EXEC serverScanIPRangeGetByScanHost_sp

#And these are the procs to call at the start and end of each scanning range.  They
        take in the ascii IP:
#serverScanIPRangeUpdateScanStart_sp
#serverScanIPRangeUpdateScanEnd_sp

#And the proc that takes in the XML and loads the instance table is...
instanceListAddUpdateXML_sp def Start_Main():
    conn_string = "DRIVER={SQL Native
        Client};Trusted_Connection=yes;timeout=2;SERVER={Enter
        Server};Database={Enter Database}"
    conn = pyodbc.connect(conn_string)
    cursor = conn.cursor()

#Server=[]
    cursor.execute("""EXEC dbo.serverScanIPRangeGetByScanHost_sp
        'P3PWMASTER01', '0""")
    ServerIP = cursor.fetchall()
    #Server = ServerIP
    #print ServerIP[0]
    for i in range(0,len(ServerIP),5):
      try:
        print str(i) + " Out of : " + str(len(ServerIP))
        print ServerIP[i][0]
        #cursor.execute("""EXEC dbo.serverScanIPRangeUpdateScanStart_sp """ +
        str(ServerIP[i][0]) + """)
        #conn.commit()
```

FIG. 4a

```
t = threading.Thread(target=SQLPing_Scanner.SQLPing_command,
args=(str(ServerIP[i][0]), str(ServerIP[i][1])))
t.daemon = True
t.start()
#cursor.execute("""EXEC dbo.serverScanIPRangeUpdateScanEnd_sp """ +
str(ServerIP[i][0]) + """)
#conn.commit()
print ServerIP[i][1]
i = i+1
print str(i) + " Out of : " + str(len(ServerIP))
#cursor.execute("""EXEC dbo.serverScanIPRangeUpdateScanStart_sp """ +
str(ServerIP[i][0]) + """)
#conn.commit()
t = threading.Thread(target=SQLPing_Scanner.SQLPing_command,
args=(str(ServerIP[i][0]), str(ServerIP[i][1])))
t.daemon = True
t.start()
#cursor.execute("""EXEC dbo.serverScanIPRangeUpdateScanEnd_sp """ +
str(ServerIP[i][0]) + """)
#conn.commit()

i = i+1
print str(i) + " Out of : " + str(len(ServerIP))

#cursor.execute("""EXEC dbo.serverScanIPRangeUpdateScanStart_sp """ +
str(ServerIP[i][0]) + """)
#conn.commit()
t = threading.Thread(target=SQLPing_Scanner.SQLPing_command,
args=(str(ServerIP[i][0]), str(ServerIP[i][1])))
t.daemon = True
t.start()
#cursor.execute("""EXEC dbo.serverScanIPRangeUpdateScanEnd_sp """ +
str(ServerIP[i][0]) + """)
#conn.commit()
i = i+1
print str(i) + " Out of : " + str(len(ServerIP))
#cursor.execute("""EXEC dbo.serverScanIPRangeUpdateScanStart_sp """ +
str(ServerIP[i][0]) + """)
#conn.commit()
t = threading.Thread(target=SQLPing_Scanner.SQLPing_command,
args=(str(ServerIP[i][0]), str(ServerIP[i][1])))
```

FIG. 4b

```
        t.daemon = True
        t.start()
        #cursor.execute("""EXEC dbo.serverScanIPRangeUpdateScanEnd_sp """ +
str(ServerIP[i][0]) + """)
        #conn.commit()
        i = i+1
        print str(i) + " Out of : " + str(len(ServerIP))
        #cursor.execute("""EXEC dbo.serverScanIPRangeUpdateScanStart_sp """ +
str(ServerIP[i][0]) + """)
        #conn.commit()
        t = threading.Thread(target=SQLPing_Scanner.SQLPing_command,
        args=(str(ServerIP[i][0]), str(ServerIP[i][1])))
        t.daemon = True
        t.start()
        #cursor.execute("""EXEC dbo.serverScanIPRangeUpdateScanEnd_sp """ +
str(ServerIP[i][0]) + """)
        #conn.commit()
        print "#"*5
        t.join()
    except Exception as e:
        print "Error in the Threads: " + str(es)

############################################################################
        ##################################################################
if __name__ == "__main__":
    Start_Main()
```

FIG. 4c

```

# Acropolis_test_v4.py
# _Author_ Ganesh Devarajan
## ## ## ## ## ## ## ## ## ## ## ## ## ## ## ## ## ## ## ## ## ## ## ## ## import pyodbc
import time
import threading filepath = "output/"
fwrite = open(filepath + "" + "Servernames_Details_"
        +time.strftime("%d%b%Y%H%M%S")+ ".txt" , 'w' )

def Query_Server(serverName,sID):
    #print serverName
    conn_string = "DRIVER={SQL Server Native Client
        10.0};Trusted_Connection=yes;timeout=2;SERVER=" + serverName.strip()
    conn = pyodbc.connect(conn_string)
    cursor = conn.cursor()
    print "Connected to Server: " + serverName cursor.execute('''
        select name
        from master.dbo.sysdatabases
        where name NOT IN ('tempdb', 'master')
        ''')
    dbName = cursor.fetchall()
    #print dbName
    for db in dbName:
        print db[0]
        query = '''use ['''+ str(db[0])+ ']'
        #print query
        cursor.execute(query)

q3 = """
        SELECT
        tb.TABLE_CATALOG,
        tb.TABLE_NAME,
        tc.COLUMN_NAME,
        tc.DATA_TYPE,
```

FIG. 5a

```
CASE WHEN column_name like '%mail%' then 'email'
    WHEN column_name like '%email%' then 'email'
    WHEN column_name like '%e-mail%' then 'email'
    WHEN column_name like '%ToAddress%' then 'email'
    WHEN column_name like '%FromAddress%' then 'email'
    WHEN column_name like '%ccAddress%' then 'email'

ELSE 'other'
END as Keyword,
COALESCE(i.rows, 0) as NumOfRecords
FROM INFORMATION_SCHEMA.TABLES tb
INNER JOIN INFORMATION_SCHEMA.COLUMNS tc ON (tb.TABLE_CATALOG
    = tc.TABLE_CATALOG) AND
(tb.TABLE_NAME = tc.TABLE_NAME ) AND
(tb.TABLE_SCHEMA = tc.TABLE_SCHEMA )
INNER JOIN sysobjects o ON tb.TABLE_NAME = o.[name] AND o.xtype='U'
LEFT JOIN sysindexes i ON o.id = i.id AND i.indid = 1
WHERE (column_name like '%mail%' OR column_name like '%email%' OR
    column_name like '%e-mail%' OR column_name like '%ToAddress%' OR
    column_name like '%FromAddress%' OR column_name like '%ccAddress%')
        AND tc.CHARACTER_MAXIMUM_LENGTH IS NOT NULL
        AND tb.table_catalog NOT IN ('master', 'tempdb','msdb')
ORDER BY tb.table_name
"""

cursor.execute(q3)
# either resultset or the count needs to be greater than 0
resultset = cursor.fetchall()
#print resultset
if resultset != []:
    print resultset
    print "\n" + serverName.strip()+ "\n" + "*"*len(serverName.strip())

fwrite.write("DATABASE,TABLE_NAME,COLUMN_NAME,DATA_TYPE,KEY_W
    ORD,COUNT\n")
    for rows in resultset:
#print "\nROWS"
#print "# # # "*10
#print rows
```

FIG. 5b

```
        rcount = 0 fwrite.write(str(rows[0])+","+str(rows[1])+","+str(rows[2])+","+str(rows[3])+","+str(rows[4])+","+str(rows[5])+"\n")
        rule_id_query = """select i_Rule_ID from Acropolis.dbo.Rule_Include where
i_Rule_Name = '%s';"""%  str(rows[4])
            #print rule_id_query
            db_cursor.execute(rule_id_query)
            rule_id = db_cursor.fetchone()
            #print rule_id
            rule = rule_id[0]
            sample = ''
            if int(rows[5])> 0:
                #print int(rows[5])
                try:
                    rcount = int(rows[5])
                    data_query = " select top 1 ["+str(rows[2])+"] from ["+str(rows[1])+"]
(nolock) where ["+str(rows[2])+"] is not null"
                    cursor.execute(data_query)
                    dataset = cursor.fetchone()
                    #print "Dataset ############## > ", data_query
                    if dataset != None:
                        #print rows
                        #print "DATA ====================>" + str(dataset[0])
fwrite.write("DATA ====================>"+str(dataset) + "\n")
                        sample = str(dataset[0])
                except Exception as datadipError:
                    print "Error in the Data Dip: ", datadipError
            DB_Insert(rows,rule,sample,rcount,serverName)
                #datawrite = open(filepath + "output\\data_"+ str(rows[0])+ "_" +
    str(rows[1])+"_" +str(rows[2]), "w")
                #datawrite.write(str(dataset))

#   conn.commit()
    cursor.close()
    conn.close()

def DB_Insert(toWrite,rule_id,sample,rcount,serverName):
    #print " Inside DB_Insert:"
    #print toWrite , rule_id, sample, str(rcount)
```

FIG. 5c

```
# Database_Name
db_S_ID_Query = """
    select s_ID from dbo.Server_Scans
    where s_IP_Addr = '%s' or s_Hostname = '%s';
    """%(serverName.strip(),serverName.strip())

db_cursor.execute(db_S_ID_Query)
s_ID_Val = db_cursor.fetchone()
#print s_ID_Val[0]
try:
    db_Insert_Query = """
        INSERT  INTO Acropolis.dbo.Database_Name (
        s_ID,db_Name,db_Description,db_Add_Date)
        Values (%s, '%s','',getdate());
        """%(s_ID_Val[0],str(toWrite[0]))
    #print "* * * "*30,"\n", db_Insert_Query
    db_cursor.execute(db_Insert_Query)
    db_conn.commit()
except Exception as e:
    #print "Duplicate DB_Name : " #+ str(e)
    if str(e).find("Violation of UNIQUE KEY constraint 'UQ_DB_Name_s_ID'. Cannot
        insert duplicate key in object 'dbo.Database_Name'"):
        #print "="*30 + "> Found the Unique Key Updating db_Mod_date"
        db_update_Query = """
            update dbo.Database_Name  set db_Mod_Date = getdate()
            where db_Name = '%s' and s_ID = %s;
            """%(str(toWrite[0]), s_ID_Val[0])
        db_cursor.execute(db_update_Query)
        db_conn.commit()

# Table_Name
db_dn_ID_Query = """
    select db_ID from dbo.Database_Name
    where db_Name = '%s' and s_ID = '%s';
    """%(str(toWrite[0]),s_ID_Val[0])
#print db_dn_ID_Query
db_cursor.execute(db_dn_ID_Query)
db_ID_Val = db_cursor.fetchone()
#print db_ID_Val[0]
try:
```

FIG. 5d

```
    tb_Insert_Query = """
       INSERT INTO Acropolis.dbo.Table_Name
       ( db_ID,t_Table_Name,t_Row_Count,t_Add_Date )
       Values (%s, '%s',%s,getdate());
       """%(db_ID_Val[0],str(toWrite[1]),str(rcount))
    #print tb_Insert_Query
    db_cursor.execute(tb_Insert_Query)
    db_conn.commit()
except Exception as e:
    #print "Duplicate TB_Name : " #+ str(e)

if str(e).find("Violation of UNIQUE KEY constraint 'UQ_Table_Name_DB_ID'.
       Cannot insert duplicate key in object 'dbo.Table_Name'"):
       #print "="*30 + "> Found the Unique Key Conflict in Table_Name Updating
       Mod_date"
       tb_update_Query = """
          update dbo.Table_Name  set t_Mod_Date = getdate()
          where t_Table_Name = '%s' and db_ID = %s;
       """%(str(toWrite[1]), db_ID_Val[0])
       db_cursor.execute(tb_update_Query)
       db_conn.commit()

# Column_Name
 db_tn_ID_Query = """
       select t_ID from dbo.Table_Name
       where t_Table_Name = '%s' and db_ID = '%s';
       """%(str(toWrite[1]),db_ID_Val[0])
#print "$%$%"*30
#print db_tn_ID_Query
#print "$%$%"*30
db_cursor.execute(db_tn_ID_Query)
tn_ID_Val = db_cursor.fetchone()
#print tn_ID_Val[0]
try:
    cn_Insert_Query = """
       INSERT INTO Acropolis.dbo.Column_Name
       (
       t_ID,c_Column_Name,i_Rule_ID,c_Sample,acro_investigationStatusID,c_Data_
       Type,c_Risk,c_Add_Date )
       Values(%s,'%s', %s,'%s',1,'%s', 0, getdate());
       """%(tn_ID_Val[0],str(toWrite[2]),rule_id,sample,str(toWrite[3]))
```

FIG. 5e

```
        #print cn_Insert_Query
        db_cursor.execute(cn_Insert_Query)
        db_conn.commit()
    except Exception as e:
        #print "Duplicate column_Name : " + str(e)
        if str(e).find("Violation of UNIQUE KEY constraint
            'UQ_t_ID_Column_Name_i_Rule_ID'. Cannot insert duplicate key in object
            'dbo.Column_Name'"):
            #print "="*30 + "> Found the Unique Key Conflict in Column_Name Updating
            Mod_date"
            cn_update_Query = """
                update dbo.Column_Name  set c_Mod_Date = getdate()
                where c_Column_Name = '%s' and t_ID = %s;
            """%(str(toWrite[2]), tn_ID_Val[0])
            db_cursor.execute(cn_update_Query)
            db_conn.commit()

def Read_Server_List():
    ##
    ## This should have the Query to pull the data from the Server_Scans table and then
        pass on the Information to the
    ## Query_Server Method
    ##
    print "Started the Read Server List"
    '''
    db_cursor.execute("""
        select
            distinct s_IP_Addr as serverName,
            s_ID
            --s_Hostname
        from
            dbo.Server_Scans
        where
            acro_databaseTypeID = 1
            and s_Last_Scan_Date < getdate()-30
            and s_Exclude != 1
                and s_IP_Addr != ''
                and acro_environmentID = 1
    union
    select
```

FIG. 5f

```
                distinct s_Hostname as serverName ,
                    s_ID
            from
                dbo.Server_Scans
            where
                acro_databaseTypeID = 1
                and s_Last_Scan_Date < getdate()-30
                and s_Exclude != 1
                    and s_IP_Addr = ''
                    and acro_environmentID = 1
            order by serverName """)
    '''
    #Day 1 Prod Server T3
    #db_cursor.execute("""select  s_IP_Addr,s_ID from dbo.Server_Scans where
            S_SVR_Environment = 'PROD-T3'""")

# Day 2 Prod Servers T2
    #db_cursor.execute("""select  s_IP_Addr,s_ID from dbo.Server_Scans where
            S_SVR_Environment = 'PROD-T1' order by s_IP_Addr""")
    # This is the Undefined list of servers
    db_cursor.execute("""
        select
        s_IP_Addr,s_ID from dbo.Server_Scans where acro_environmentID in (3,4) and
        acro_databaseTypeID = 1
        and s_ID = 3650 order by s_IP_Addr""")

server_Scan_List = db_cursor.fetchall()

i =0
    ##    for c in range(0,len(server_Scan_List),2):
        for server in server_Scan_List:
            ##server = server_Scan_List[c]
```

FIG. 5g

```
            #print server
            print "Completed " + str(i) + " of " + str(len(server_Scan_List))+ "\n" +
              "*"*len("Completed " + str(i) + " of " + str(len(server_Scan_List)))

serverName = server[0]
            print "serverName ==>", serverName
            sID = server[1]
            try:
t = threading.Thread(target=Query_Server, args=(serverName,sID))
t.daemon = True
t.start()
              Query_Server(serverName,sID)
              db_SS_Update_LastScanDate_Query = """update dbo.Server_Scans set
              s_Last_Scan_Date = getdate(), acro_scanstatusID = 3 where s_ID =
              '%s';"""%(sID)
              db_cursor.execute(db_SS_Update_LastScanDate_Query)
              db_conn.commit()
              #print db_SS_Update_LastScanDate_Query except Exception as QS_error:
              ##if str(QS_error).find("A network-related or instance-specific error has
              occurred"):
              if QS_error[0]== '08001':
                print "Error Connecting Server: " + str(server[0])
                #print str(QS_error)
                db_SS_Update_status_Query = """update dbo.Server_Scans set
                s_Last_Scan_Date = getdate(), acro_scanstatusID = 4 where s_ID =
                '%s';"""%(sID)
                db_cursor.execute(db_SS_Update_status_Query)
                db_conn.commit()
              else:
Might have to add a new scanstatusID for just "Error"
                print str(QS_error)
                db_SS_Update_status_Error_Query = """update dbo.Server_Scans set
                s_Last_Scan_Date = getdate(), acro_scanstatusID = 2 where s_ID =
                '%s';"""%(sID)
                db_cursor.execute(db_SS_Update_status_Error_Query)
                db_conn.commit()

```
            i += 1 server = server_Scan_List[c]
print server
print "Completed " + str(i) + " of " + str(len(server_Scan_List)) + + "\n" +
        "*"*len("Completed " + str(i) + " of " + str(len(server_Scan_List)))

serverName = server[0]
print "serverName ==>" + serverName
sID = server[1]
try:
t = threading.Thread(target=Query_Server, args=(serverName,sID))
t.daemon = True
t.start()

db_SS_Update_LastScanDate_Query = """update dbo.Server_Scans set
        s_Last_Scan_Date = getdate(), acro_scanstatusID = 3 where s_ID =
        '%s';"""%(sID)
db_cursor.execute(db_SS_Update_LastScanDate_Query)
db_conn.commit()
#print db_SS_Update_LastScanDate_Query

except Exception as QS_error:
if str(QS_error).find("Could not open a connection to SQL Server"):
print "Error Connecting Server: " + str(server[0])
#print str(QS_error)
db_SS_Update_status_Query = """update dbo.Server_Scans set
        s_Last_Scan_Date = getdate(), acro_scanstatusID = 2 where s_ID =
        '%s';"""%(sID)
db_cursor.execute(db_SS_Update_status_Query)
db_conn.commit()
else:
Might have to add a new scanstatusID for just "Error"
#print str(QS_error)
db_SS_Update_status_Error_Query = """update dbo.Server_Scans set
        s_Last_Scan_Date = getdate(), acro_scanstatusID = 2 where s_ID =
        '%s';"""%(sID)
db_cursor.execute(db_SS_Update_status_Error_Query)
db_conn.commit()
t.join()
```

FIG. 5i

```

i += 1 if __name__ == '__main__':
   try:

global db_conn
      global db_cursor
      db_conn_string = "DRIVER={SQL Server Native Client
         10.0};Trusted_Connection=yes;timeout=2;SERVER=P3PWMaster02;DATABAS
         E=acropolis"
      db_conn = pyodbc.connect(db_conn_string)
      db_cursor = db_conn.cursor()

print "Started the Program"
      Read_Server_List()
fwrite.close()

#db_conn.commit()
      db_cursor.close()
      db_conn.close()
   except Exception as ee:
      print "ERROR: " + str(ee)
```

FIG. 5j

Acropolis: Findings and Assignments

ACROPOLIS REPORTING

Environments: DEV, PROD, TEST, Undefined
Assigned To: ▇▇▇▇▇▇    Report Type: All
Rule Names: email

| IPAddress > Database > Table | Databases | Tables |
|---|---|---|
| ⊞ LocalDirectory | -- | 1 |
| ⊞ OutReach | -- | 7 |
| ⊞ proxima | -- | 6 |
| ⊞ MailList | -- | 75 |
| ⊞ Contact | -- | 1 |

FIG. 6

Acropolis: Findings and Assignments

ACROPOLIS REPORTING

Environments: DEV, PROD, TEST, Undefined
Assigned To: ▇▇▇▇▇▇    Report Type: All
Rule Names: email

| IPAddress > Database > Table | Databases | Tables | |
|---|---|---|---|
| ⊟ LocalDirectory | -- | 1 | |
| ⊟ 172.19.▇▇▇ (G1▇▇▇▇CORP.GD) | | | |
| ⊟ ContactData | Columns: 1 | Total Records: 35 | |
| Column Name | Rule Name | Sample | Status Update |
| businessEmail | email | auto@auto.com | False Positive  Vendor<br>Regl Column  Complaint<br>Required  Dropped<br>Dev Needed |
| ⊞ OutReach | -- | 7 | |
| ⊞ proxima | -- | 6 | |

FIG. 7

SYSTEMS FOR DISCOVERING SENSITIVE INFORMATION ON COMPUTER NETWORKS

CROSS REFERENCE TO RELATED PATENT APPLICATIONS

This patent application is related to U.S. patent application Ser. No. 13/436,747 entitled "Methods for Discovering Sensitive Information on Computer Networks" concurrently filed herewith.

FIELD OF THE INVENTION

The present invention relates in general to discovering sensitive information on computer networks.

BACKGROUND OF THE INVENTION

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

For Internet users and businesses alike, the Internet continues to be more and more valuable. People are increasingly using the Web for everyday tasks such as social networking, shopping, banking, paying bills, and consuming media and entertainment. E-commerce is growing, with businesses delivering more services and content across the Internet, communicating and collaborating online, and inventing new ways to connect with each other.

Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), hosting companies exist that offer website hosting services. These hosting providers typically provide the hardware, software, and electronic communication means necessary to connect multiple websites to the Internet. A single hosting provider may literally host thousands of websites on one or more hosting servers.

Websites may be created using HyperText Markup Language (HTML) to generate a standard set of tags that define how the webpages for the website are to be displayed. Users of the Internet may access content providers' websites using software known as an Internet browser, such as MICROSOFT INTERNET EXPLORER, MOZILLA FIREFOX, or GOOGLE CHROME. After the browser has located the desired webpage, it requests and receives information from the webpage, typically in the form of an HTML document, and then displays the webpage content for the user. The user then may view other webpages at the same website or move to an entirely different website using the browser.

Browsers are able to locate specific websites because each computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses. For certain TLDs (e.g., .biz, .info, .name, and .org) the registry is also the authoritative source for contact information related to the domain name and is referred to as a "thick" registry. For other TLDs (e.g., .com and .net) only the domain name, registrar identification, and name server information is stored within the registry, and a registrar is the authoritative source for the contact information related to the domain name. Such registries are referred to as "thin" registries. Most gTLDs are organized through a central domain name Shared Registration System (SRS) based on their TLD.

The process for registering a domain name with .com, .net, .org, and some other TLDs allows an Internet user to use an ICANN-accredited registrar to register their domain name. For example, if an Internet user, John Doe, wishes to register the domain name "mycompany.com," John Doe may initially determine whether the desired domain name is available by contacting a domain name registrar. The Internet user may make this contact using the registrar's webpage and typing the desired domain name into a field on the registrar's webpage created for this purpose. Upon receiving the request from the Internet user, the registrar may ascertain whether "mycompany.com" has already been registered by checking the SRS database associated with the TLD of the domain name. The results of the search then may be displayed on the webpage to thereby notify the Internet user of the availability of the domain name. If the domain name is available, the Internet user may proceed with the registration process. Otherwise, the Internet user may keep selecting alternative domain names until an available domain name is found.

Domain names are typically registered for a period of one to ten years with first rights to continually re-register the domain name.

An individual or entity's domain name is increasingly the anchor around which their online presence is maintained. For example, a company's website (www.companyname.com) and email system (john.doe@companyname.com) utilize the company's domain name as an integral part of their architecture. Similarly, many Internet users use their email address, and therefore their domain name, as a means of identification on social websites, which have proliferated in recent years. Social websites are social networking services that focus on building and verifying online social networks for communities of people who share interests and activities, or who are interested in exploring the interests and activities of others, and which necessitates the use of software. Most social websites are Internet based and provide a collection of various ways for users to interact, such as chat, messaging, email, video, voice chat, personal information sharing, image sharing, video sharing, file sharing, status updates, blogging, discussion groups, commentary, etc. The main types of social networking services are those which contain directories of some categories (such as former classmates), means to connect with friends (usually with self-description pages), and/or recommendation systems linked to trust. Popular methods now combine many of these, with FACEBOOK, TWITTER, YOUTUBE, LINKEDIN, MYSPACE, BEBO, PHOTOBUCKET, SNAPFISH, WINDOWS LIVE PHOTOS, WEBSHOTS, and FLICKR being but a few examples.

Such social websites often post their members' public webpages for all Internet users to view, without authentication or login. Conversely, members' private webpages may only be accessed and viewed by the member. The private webpages generally require member authentication and provide the member with tools to manage his public webpage, communicate with other members, and/or otherwise manage his social website membership.

Many social websites, typically those that receive or share sensitive information (as well as websites associated with banks, credit card companies, and online businesses), may require Internet users to login to the website with a secure username and password before accessing the website's content.

The username/password system is a common form of secret authentication data used to control website access. The username/password is kept secret from those not allowed access. Those wishing to gain access are tested on whether or not they have a valid (recognized) username and whether they know the associated password. Internet users are granted or denied access to websites accordingly.

Many social websites have different rules governing the creation of usernames and passwords. Some require passwords that include a complex combination of letters, numbers, and other characters. Others have no restrictions whatsoever. With the proliferation of login-access websites, Internet users often must remember dozens (or more) different username/password combinations, one for each secure website they wish to access. This has resulted in what has come to be known as "password fatigue."

Partly in response to these issues, the concept of the "digital identity" has evolved. A digital identity is a set of characteristics by which a person or thing is recognizable or distinguished in the digital realm. Digital identity allows for the electronic recognition of an individual or thing without confusing it for someone or something else.

There are many applications for an Internet user's digital identity, including authenticating the user before permitting access to a website. One method for such authentication includes the use of a URL. URL-based digital identity systems (such as OPENID) utilize a framework based on the concept that any individual or entity can identify themselves on the Internet with a URL provided by a Digital Identity Provider (e.g., johndoe.openid.com). The Digital Identity Provider maintains an Identity Server on which a Digital Identity Database (a database of provided digital identity URLs and the corresponding authentication passwords) is stored.

Once obtained, the Internet user may utilize their digital identity URL to access various websites. For example, to login to an OpenID-enabled website, the user enters their OpenID (e.g., johndoe.openid.com) in the username box. The user is then momentarily redirected to the user's Digital Identity Provider's website (or an authentication window appears) to login using whatever password they have set up with their Digital Identity Provider. Once authenticated, the Digital Identity Provider sends the participating website an encrypted message (a token) confirming the identity of the person logging in. There are currently numerous Digital Identity Providers offering URL-based (OpenID) digital identity services, meaning they offer digital identity URLs and servers to authenticate them.

One of the problems facing companies is properly securing customer records and companies' own records. Applicant hereby proposes novel systems and methods for discovering sensitive information on computer networks.

BRIEF DESCRIPTION OF THE DRAWINGS

FIG. 1 contains an SQL computer code demonstrating the best mode implementation of the present invention.

FIGS. 2a-2b contain a computer code demonstrating the best mode implementation of the present invention.

FIGS. 3a-3c contain a computer code demonstrating the best mode implementation of the present invention.

FIGS. 4a-4c contain a computer code demonstrating the best mode implementation of the present invention.

FIGS. 5a-5j contain a computer code demonstrating the best mode implementation of the present invention.

FIGS. 6-7 contain a screenshots demonstrating the best mode implementation of the present invention.

DETAILED DESCRIPTION AND PREFERRED EMBODIMENT

Figure 8:
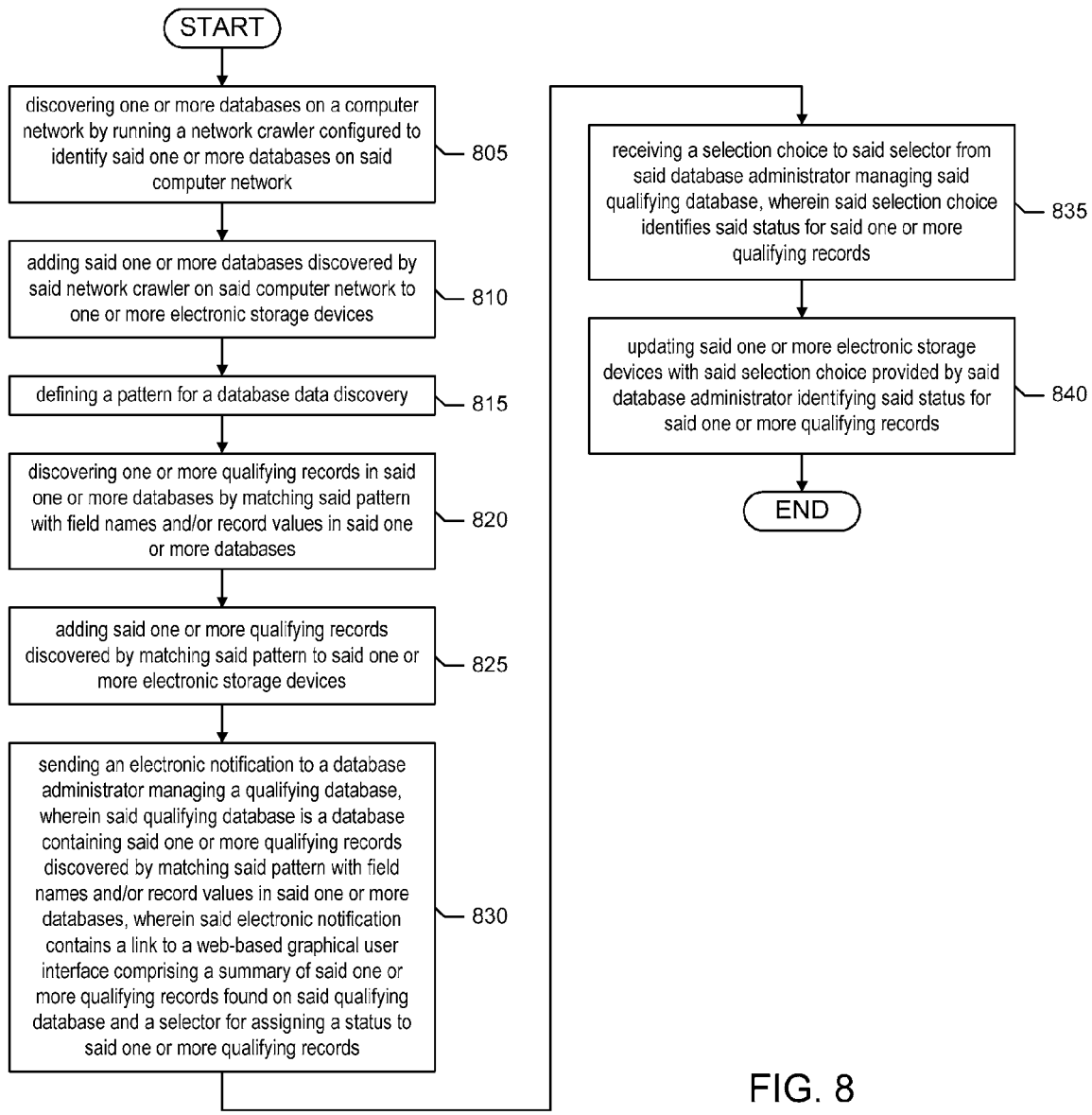
FIG. 8 is a flowchart illustrating an embodiment of a method of the present invention.

The present invention will now be discussed in detail with regard to the attached drawing figures which were briefly described above. In the following description, numerous specific details are set forth illustrating the Applicant's best mode for practicing the invention and enabling one of ordinary skill in the art of making and using the invention. It will be obvious, however, to one skilled in the art that the present invention may be practiced without many of these specific details. In other instances, well-known machines and method steps have not been described in particular detail in order to avoid unnecessarily obscuring the present invention. Unless otherwise indicated, like parts and method steps are referred to with like reference numerals.

Often the news reports that some company got hacked and thousands of SSN or credit card numbers were stolen. Some of these data leaks are due to abandoned database servers. The database servers may get abandoned in a rapidly growing company, when project get scrapped or upgraded, when employee resigns, or when the database server inventory is poorly managed. Sometimes the abandoned databases hold some critical, private, sensitive, or propriety information like login credentials, credit card numbers, or Personal Information (PI). When a server is not actively managed, it may get behind with security patches and updates. When a poorly managed server falls in the hacker's hands, the company may loose its reputation and competitive advantage.

The approach used in the present invention envisions crawling the network from a central point and finding the list of computers running a database instance. After the database types and versions are identified for each computer, a custom code is run to determine if there is any sensitive information in the database. If any sensitive information is found, then it gets reported back to the central database. The custom code may differ depending on the database type and/or version.

The database servers to be checked for critical information are either coming from a predetermined list or by using a network crawler or prober to identify computers containing a database instance. Using a network crawler may identify more computers containing a database instance than a predetermined list.

The inventors anticipate that the invention will help (1) to identify the unaccounted servers that are running on the network holding sensitive data, (2) to identify no longer used servers on the network, (3) to determine if the sensitive data is in plain text or encrypted (and level of encryption), (4) to spot any computers running a database server without authorization (potential insider's threat), (5) to secure sensitive data, (6) to save money in the power consumption by retiring unused servers, (7) to save money in the software licensing costs by retiring unused servers, etc.

The system implementing the present invention may contain a network crawler (prober) and a database parser.

The network crawler (prober, mapper) is a device or a computer readable code executed on a device that goes through the selected or entire range of IP addresses used by the organization, e.g., 171.16.0.0/19 or 10.0.0.0/8, etc. It may employ ICMP pings and/or TCP connection requests. If a server responds, then it may gather a partial or the entire list of port numbers that are open on the server. The information about the network servers and/or ports may be saved into one or more electronic storage devices. Open port 1433 may indicate that a MSSQL database is running on the server, open port 1521 may indicate that an ORACLE database is running on the server, open port 3306 may indicate that a MySQL database is running on the server, etc.

The database parser runs a code or query on the found database server to determine the presence of the sensitive information on the server.

A sample computer code for implementing the present invention is shown FIGS. 1, 2a-2c, 3a-3c, 4a-4c, and 5a-5j.

An exemplary embodiment of a method of the present invention is shown in FIG. 8. The method comprises the steps of: discovering one or more databases on a computer network by running a network crawler configured to identify said one or more databases on said computer network (Step 805), adding said one or more databases discovered by said network crawler on said computer network to one or more electronic storage devices (Step 810), defining a pattern for a database data discovery (Step 815), discovering one or more qualifying records in said one or more databases by matching said pattern with field names and/or record values in said one or more databases (Step 820), adding said one or more qualifying records discovered by matching said pattern to said one or more electronic storage devices (Step 825), sending an electronic notification to a database administrator managing a qualifying database, wherein said qualifying database is a database containing said one or more qualifying records discovered by matching said pattern with field names and/or record values in said one or more databases, wherein said electronic notification contains a link to a web-based graphical user interface comprising a summary of said one or more qualifying records found on said qualifying database and a selector for assigning a status to said one or more qualifying records (Step 830), receiving a selection choice to said selector from said database administrator managing said qualifying database, wherein said selection choice identifies said status for said one or more qualifying records (Step 835), and updating said one or more electronic storage devices with said selection choice provided by said database administrator identifying said status for said one or more qualifying records (Step 840).

The network crawler loops through a set range of network addresses and identifies servers with databases. The electronic storage devices may include any database or a file storage configured to store the data created or utilized by the methods or systems of the present invention. The pattern for the database data discovery may include keywords and keyphrases, e.g., "email", "credit card", "user", "login" or wildcard or standardized patterns (such as regular expressions), e.g., "%email%", "*e*mail*", "^4[0-9]{12}(?:[0-9]{3})?$" (for Visa credit cards, all Visa card numbers start with a 4, new cards have 16 digits, old cards have 13), "^5[1-5][0-9]{14}$" (for MasterCard), "^3[47][0-9]{13}$" (for American Express), "^3(?:0[0-5]1[68][0-9])[0-9]{11} $" (for Diners Club), "^6(?:011|5[0-9]{2})[0-9]{12} $" (for Discover), "^(?:2131|1800|35\d{3})\d{11}$" (for JCB), "\b[A-Z0-9._%-]+@[A-Z0-9.-]+\.[A-Z]{2,4}\b" (for email), etc.

The electronic notification sent to the database administrator may be an email message, a text message, a telephone call, a pager call, a facsimile, etc. The database administrator managing a particular database may be determined from the database or server permissions or from a precompiled list.

A sample embodiment of the web-based graphical user interface with the summary of the qualifying records is shown in FIGS. 6 and 7.

The selector for assigning the status to the qualifying records may be implemented as a list, a drop-down, a radio-button choice, a link list, etc. The selector may contain a variety of values, such as, "false positive" (the records were marked in error), "vendor" (the qualifying records are in a third-party database), "replication column" (the qualifying records are part of a replication column), "compliant" (the qualifying records are compliant with the company policies), "required" (the qualifying records may not be compliant, but are required to be present at the database at this time), "dropped" (the qualifying records or related columns were deleted or dropped), "dev" (the qualifying records are needed for development purposes), etc.

The web-based graphical user interface may contain additional fields (e.g., text field) for the database administrator to provide additional explanations for the qualifying records.

After the database administrator sets the status, the system may further determine if the selection choice provided by the database administrator passes automated validation. E.g., if the database administrator sets the status to "dropped", the system may check if the qualifying records or related columns were actually dropped, etc.

The system may further determine whether the record values in the qualifying records are encrypted and/or what level of encryption is used. Encrypted records may be compliant with the company data storage policies.

The invention may be implemented on a variety of computer networks. This may include a LAN (Local Area Network), WLAN (Wireless Local Area Network), WAN (Wide Area Network), MAN (Metropolitan Area Network), a global network, etc. The Internet is a widely-used global computer network. The computer networks may support a variety of a network layer protocols, such as, DHCP (Dynamic Host Configuration Protocol), DVMRP (Distance Vector Multicast Routing Protocol), ICMP/ICMPv6 (Internet Control Message Protocol), IGMP (Internet Group Management Protocol), IP (Internet Protocol version 4), IPv6 (Internet Protocol version 6), MARS (Multicast Address Resolution Server), PIM and PIM-SM (Protocol Independent Multicast-Sparse Mode), RIP2 (Routing Information Protocol), RIPng for IPv6 (Routing Information Protocol for IPv6), RSVP (Resource ReSerVation setup Protocol), VRRP (Virtual Router Redundancy Protocol), etc. Further, the computer networks may support a variety of a transport layer protocols, such as, ISTP (Internet Signaling Transport Protocol), Mobile IP (Mobile IP Protocol), RUDP (Reliable UDP), TALI (Transport Adapter Layer Interface), TCP (Transmission Control Protocol), UDP (User Datagram Protocol), Van Jacobson (compressed TCP), XOT (X.25 over TCP), etc. In addition, the computer network may support a variety of an application layer protocols, such as, COPS (Common Open Policy Service), FANP (Flow Attribute Notification Protocol), Finger (User Information Protocol), FTP (File Transfer Protocol), HTTP (Hypertext Transfer Protocol), IMAP and IMAP4 (Internet Message Access Protocol, rev 4), IMPPpre (Instant Messaging Presence Protocol), IMPPmes (Instant Messaging Protocol), IPDC (IP Device Control), IRC (Internet Relay Chat Protocol), ISAKMP (Internet Message Access Protocol version 4rev1), ISP, NTP (Network Time Protocol), POP and POP3 (Post Office Protocol, version 3), Radius (Remote Authentication Dial In User Service), RLOGIN (Remote Login), RTSP (Real-time Streaming Protocol), SCTP (Stream Control Transmission Protocol), S-HTTP or HTTPS (Secure Hypertext Transfer Protocol), SLP (Service Location Protocol), SMTP (Simple Mail Transfer Protocol), SNMP (Simple Network Management Protocol), SOCKS (Socket Secure Server), TACACS+ (Terminal Access Controller Access Control System), TELNET (TCP/IP Terminal Emulation Protocol), TFTP (Trivial File Transfer Protocol), WCCP (Web Cache Coordination Protocol), X-Window (X Window), etc.

The communication links between the computers on the network may include telephone line, copper twisted pair, power-line, fiber-optic, cellular, satellite, dial-up, Ethernet, DSL, ISDN, T-1, DS-1, Wi-Fi, etc.

A variety of programming languages and scripts may be used to implement the present invention, such as, Java, JavaScript, Perl, PHP, ASP, ASP.NET, Visual J++, J#, C, C++, C#, Visual Basic, VB.Net, VBScript, SQL, etc.

The computers utilized in the present invention may run a variety of operating systems, such as, MICROSOFT WINDOWS, APPLE MAC OS X, UNIX, LINUX, GNU, BSD, FreeBSD, SUN SOLARIS, NOVELL NETWARE, OS/2, TPF, eCS (eComStation), VMS, Digital VMS, OpenVMS, AIX, z/OS, HP-UX, OS-400, etc. The computers utilized in the present invention can be based on a variety of hardware platforms, such as, x86, x64, INTEL, ITANIUM, IA64, AMD, SUN SPARC, IBM, HP, etc.

The databases discovered on the network or used on electronic storage devices in the present invention may include: CLARION, DBASE, ENTERPRISEDB, EXTREMEDB, FILEMAKER PRO, FIREBIRD, FRONTBASE, HELIX, SQLDB, IBM DB2, INFORMIX, INGRES, INTERBASE, MICROSOFT ACCESS, MICROSOFT SQL SERVER, MICROSOFT VISUAL FOXPRO, MSQL, MYSQL, OPENBASE, OPENOFFICE.ORG BASE, ORACLE, PANORAMA, PERVASIVE, POSTGRESQL, SQLBASE, SQLITE, SYBASE, TERADATA, UNISYS, and many others.

Figure 9:
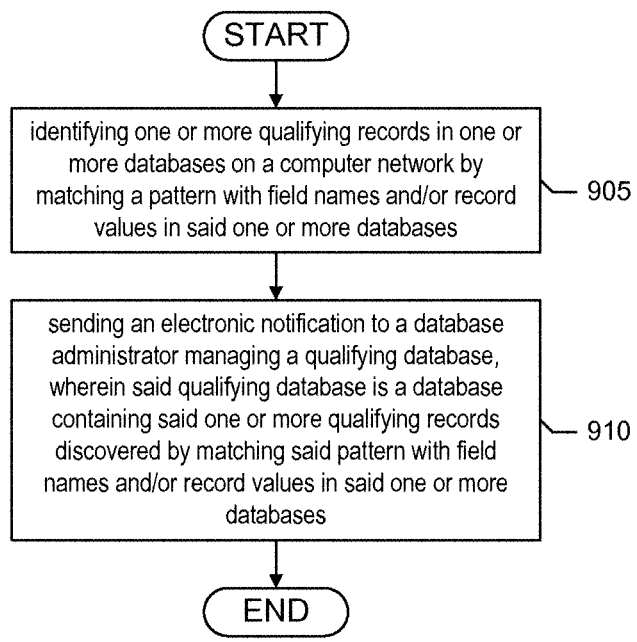
FIG. 9 is a flowchart illustrating an embodiment of a method of the present invention.

An alternative embodiment of a method of the present invention is shown in FIG. 9. The method comprises the steps of: identifying one or more qualifying records in one or more databases on a computer network by matching a pattern with field names and/or record values in said one or more databases (Step 905), and sending an electronic notification to a database administrator managing a qualifying database, wherein said qualifying database is a database containing said one or more qualifying records discovered by matching said pattern with field names and/or record values in said one or more databases (Step 910).

Figure 10:
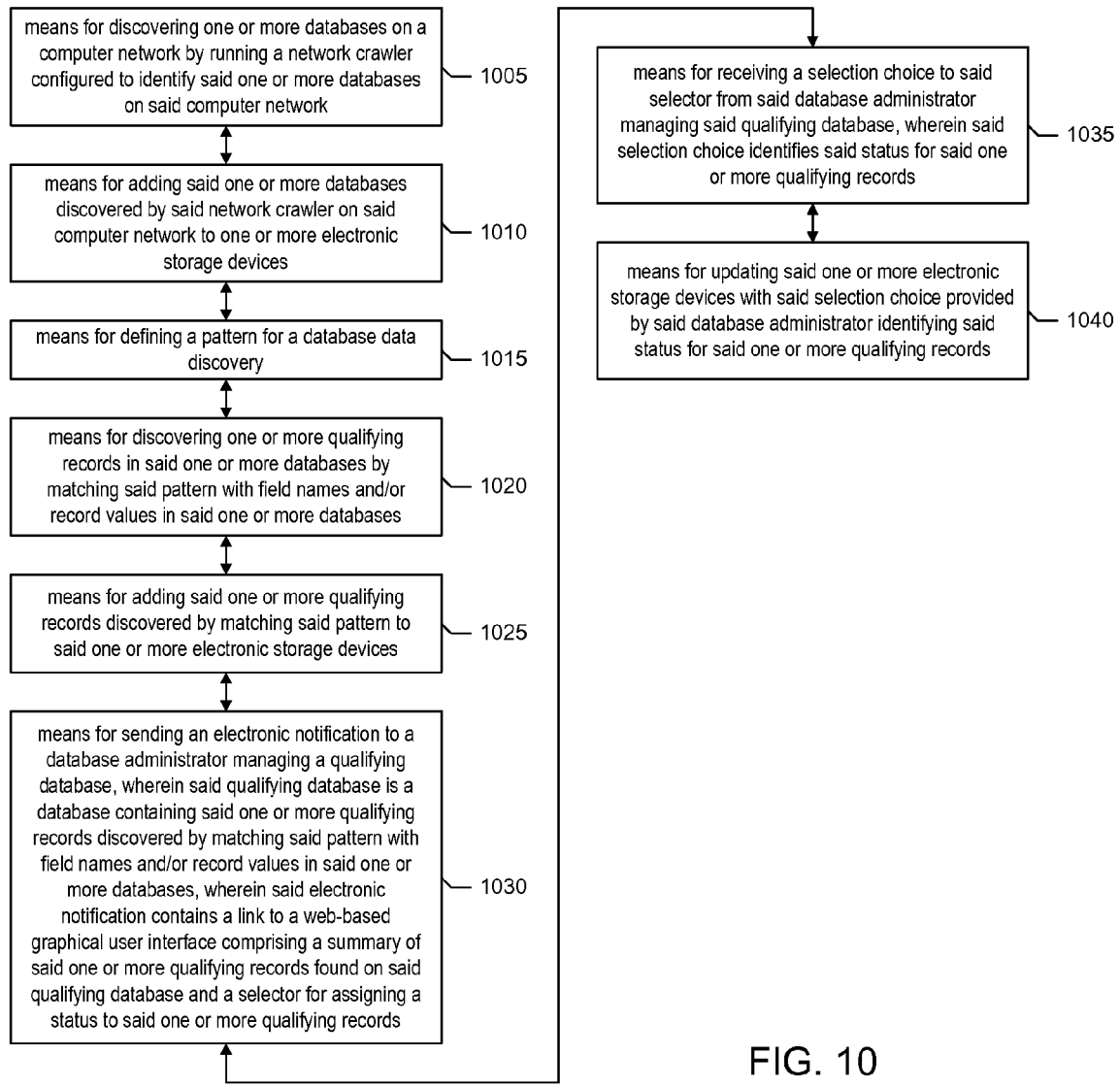
FIG. 10 is a block diagram illustrating an embodiment of means-plus-function system of the present invention.

Referring to FIG. 10, an exemplary embodiment of the system of the present invention may include: means for discovering one or more databases on a computer network by running a network crawler configured to identify said one or more databases on said computer network (1005), means for adding said one or more databases discovered by said network crawler on said computer network to one or more electronic storage devices (1010), means for defining a pattern for a database data discovery (1015), means for discovering one or more qualifying records in said one or more databases by matching said pattern with field names and/or record values in said one or more databases (1020), means for adding said one or more qualifying records discovered by matching said pattern to said one or more electronic storage devices (1025), means for sending an electronic notification to a database administrator managing a qualifying database, wherein said qualifying database is a database containing said one or more qualifying records discovered by matching said pattern with field names and/or record values in said one or more databases, wherein said electronic notification contains a link to a web-based graphical user interface comprising a summary of said one or more qualifying records found on said qualifying database and a selector for assigning a status to said one or more qualifying records (1030), means for receiving a selection choice to said selector from said database administrator managing said qualifying database, wherein said selection choice identifies said status for said one or more qualifying records (1035), and means for updating said one or more electronic storage devices with said selection choice provided by said database administrator identifying said status for said one or more qualifying records (1040).

Figure 11:
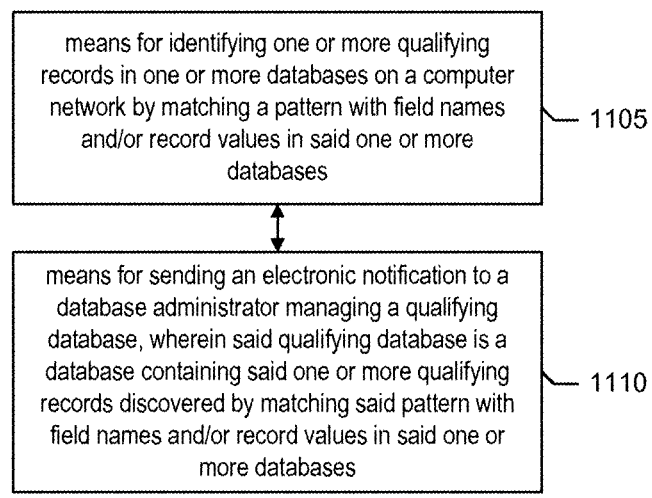
FIG. 11 is a block diagram illustrating an embodiment of means-plus-function system of the present invention.

Referring to FIG. 11, an alternative exemplary embodiment system of the present invention may include: means for identifying one or more qualifying records in one or more databases on a computer network by matching a pattern with field names and/or record values in said one or more databases (1105), and means for sending an electronic notification to a database administrator managing a qualifying database, wherein said qualifying database is a database containing said one or more qualifying records discovered by matching said pattern with field names and/or record values in said one or more databases (1110).

The means of the embodiments disclosed in the present specification can be substituted with machines, apparatuses, and devices described or listed in this specification or equivalents thereof. As a non-limiting example, the means of the embodiments may be substituted with a computing device, a computer-readable code, a computer-executable code, or any combination thereof.

All embodiments of the present invention may further be limited and implemented with any and all limitations disclosed in this specification or in the documents incorporated in this patent application by reference.

Applicant does not consider any step, element, or limitation being required or essential. The methods and systems of the present invention may be implemented without some of the disclosed steps, elements, or limitations.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and is in no way intended for defining, determining, or limiting the present invention or any of its embodiments.

The invention claimed is:

1. A system, comprising:
   a) means for discovering one or more databases on a computer network by running a network crawler configured to identify said one or more databases on said computer network,
   b) means for adding said one or more databases discovered by said network crawler on said computer network to one or more electronic storage devices,
   c) means for defining a pattern for a database data discovery,
   d) means for discovering one or more qualifying records in said one or more databases by matching said pattern with field names or record values in said one or more databases,
   e) means for adding said one or more qualifying records discovered by matching said pattern to said one or more electronic storage devices,
   f) means for sending an electronic notification to a database administrator managing a qualifying database, wherein said qualifying database is a database containing said one or more qualifying records discovered by matching said pattern with field names or record values in said one or more databases, wherein said electronic notification contains a link to a web-based graphical user interface comprising a summary of said one or more qualifying records found on said qualifying database and a selector for assigning a status to said one or more qualifying records,
   g) means for receiving a selection choice to said selector from said database administrator managing said qualifying database, wherein said selection choice identifies said status for said one or more qualifying records, and
   h) means for updating said one or more electronic storage devices with said selection choice provided by said database administrator identifying said status for said one or more qualifying records.

2. The system of claim 1, further comprising:
   i) means for determining whether said selection choice provided by said database administrator identifying said status for said one or more qualifying records passes automated validation.

3. The system of claim 1, further comprising:
   i) means for determining whether said record values in said one or more qualifying records are encrypted.

4. The system of claim 1, further comprising:
   i) means for determining a level of encryption of said record values in said one or more qualifying records.

5. The system of claim 1, wherein said selection choice provided by said database administrator indicates that said one or more qualifying records was a false positive.

6. The system of claim 1, wherein said selection choice provided by said database administrator indicates that said one or more qualifying records are in a third-party database.

7. The system of claim 1, wherein said selection choice provided by said database administrator indicates that said one or more qualifying records are contained in one or more replication columns.

8. The system of claim 1, wherein said selection choice provided by said database administrator indicates that said one or more qualifying records are compliant with company policies.

9. The system of claim 1, wherein said selection choice provided by said database administrator indicates that said one or more qualifying records are required.

10. The system of claim 1, wherein said selection choice provided by said database administrator indicates that said one or more qualifying records were deleted.

11. The system of claim 1, wherein said selection choice provided by said database administrator indicates that said one or more qualifying records are needed for development purposes.

* * * * *